(No Model.)
N. B. SCOTT.
APPARATUS FOR FORMING GLASSES, &c.
No. 411,969. Patented Oct. 1, 1889.
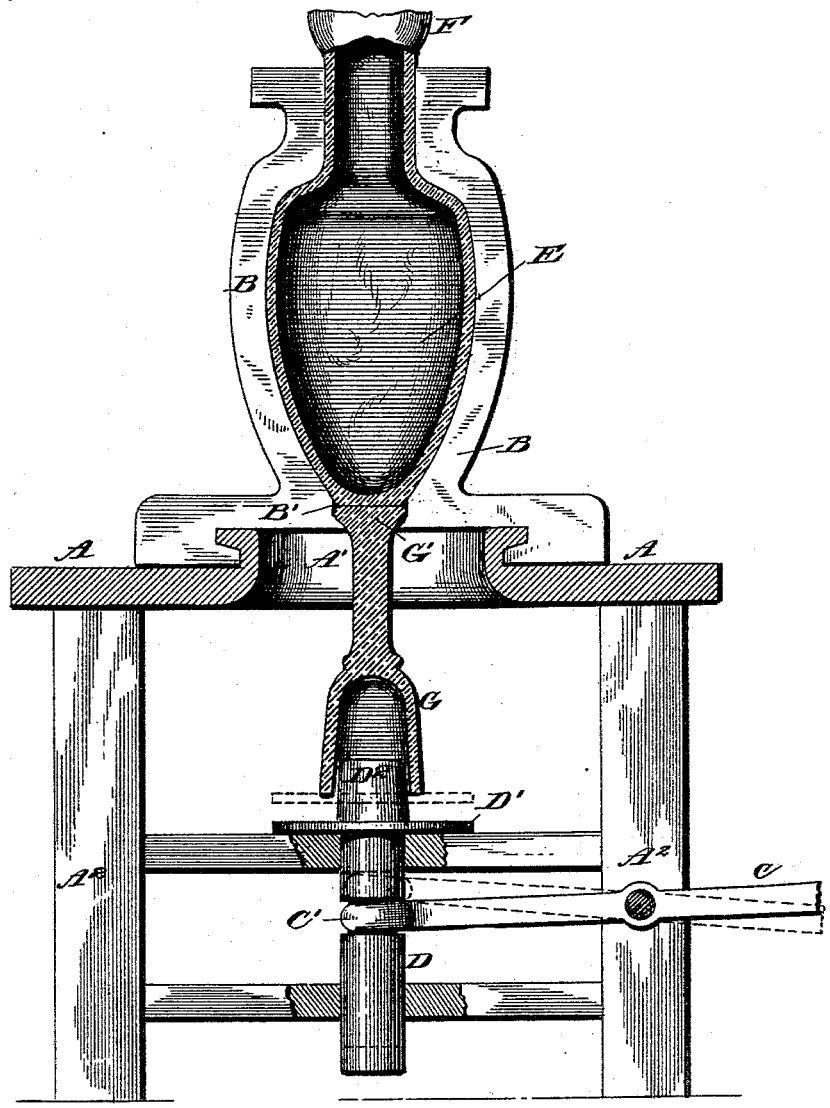
Witnesses
L. C. Hills.
Harold MacKaye
Inventor
N. B. Scott.
By E. B. Stocking
Attorney.

UNITED STATES PATENT OFFICE.

NATHAN B. SCOTT, OF WHEELING, WEST VIRGINIA.

APPARATUS FOR FORMING GLASSES, &c.

SPECIFICATION forming part of Letters Patent No. 411,969, dated October 1, 1889.

Application filed April 29, 1889. Serial No. 309,071. (No model.)

*To all whom it may concern:*

Be it known that I, NATHAN B. SCOTT, a citizen of the United States, residing at Wheeling, in the county of Ohio, State of West Virginia, have invented certain new and useful Improvements in Apparatus for Forming Glasses, &c., of which the following is a specification, reference being had therein to the accompanying drawing.

The object of my invention is the provision of an easily-operated device for joining the standards or feet to goblets, wine-glasses, &c. To this end I have constructed my device in the manner specified, and with the novel features particularly pointed out in the claims at the end of the specification.

The drawing is a vertical section of my device, showing a half-mold in full view, and the glass being shaped in section.

A is a main frame or table, upon which is formed a flange A', upon which is slid the mold B, as shown. This mold may be of any form or shape well known in the art, and may be affixed to the table in any manner, it being understood that the collar or flange A' is only one of many possible devices for this purpose. To a leg $A^3$ of the table there is pivoted a lever C, the end of which is provided with a fork or ring C'. A stem D is provided with a restricted portion bounded by two shoulders, as shown, said restricted portion passing through the fork or ring upon the end of the lever C. The vertical stem D is provided with a platform of a circular or other form, as at D', and ends in a guide $D^2$ above said platform. By tilting the lever C into the position shown in dotted lines in the figure any article upon the platform D' will be raised correspondingly.

B is one of the halves of a mold designed for glass-blowing purposes, and E therein is the mass of glass destined for the body of the goblet or wine-glass. F is the tip of a blow-pipe from which this mass depends. Ordinarily, the body of the glass having been blown, the leg is blown to the bottom in the rough state and subsequently formed. In my device there is a new method employed—namely, the preforming of the leg and subsequent blowing on of the same. The way in which this is done is by first blowing the glass into the forming-mold B, through the bottom of which there is an aperture B' directly above the top of the stem D. The leg or standard of the glass having been formed, it is put onto the platform D' in the hot state, the flare of the same being still cup-shaped, as shown at G. This little cup sets over the end of the stem, which end serves as a guide to the leg. When first placed upon the platform, the upper end of the leg (shown at G') is not flared, as shown in the drawing. The outer end of the lever C is now depressed and the platform raised into the position shown in dotted lines until the top of the standard is introduced into the aperture B' and touches the bottom of the body of the glass, as shown. In the meantime the blowing of said body continues, and the bottom of the same is pressed against the top of the standard, causing it to spread out or flare, as shown, making it fill the whole space at the bottom of the aperture, preventing the dropping of the leg from the body again and allowing the same to hang in the position shown in full lines when the platform is depressed again. The revolution of the body then takes place in the ordinary manner, the leg being steadied in the meantime by the action of the guide $D^2$ within the cup-shaped bottom of the leg. When the glass is completed, it is taken out of the mold and cut off in the usual way, the bottom of the leg being fully flared to form the base of the glass and the top being properly ground and shaped.

I do not wish to limit myself to the exact construction shown and described herein, as there may be details varied by the exercise of mechanical skill without departing from the scope of my invention.

What I claim is—

1. A device for joining glass bodies to their standards and comprising a mold for the glass bodies having an aperture therein, in combination with a movable holder adapted to hold the disconnected standard and to insert the end of the same into said aperture and press it in contact with the body to unite it thereto, substantially as specified.

2. A device for joining standards to glass bodies, comprising a holder for the glass standards adapted to move vertically, in combination with a mold for the bodies situated above said holder, with sufficient space between said aperture and holder for the standard, and provided with an aperture situated directly above said holder, substantially as specified.

3. A device for joining glass standards to glass bodies, consisting of a table having a flanged collar and a body-mold fitting over said collar and constructed to form the body only, in combination with a stem bearing a platform arranged at a distance from the bottom of said mold and adapted to slide vertically under said mold beneath an aperture therein, substantially as specified.

4. A device for joining glass bodies and standards, consisting of a table having a flanged collar and an apertured mold fitting over said collar and designed to form the body only, in combination with a vertically-sliding stem under said aperture, a platform on said stem, a guide projecting above said platform, and a lever pivoted to said table and connected to said stem, substantially as specified.

5. A device for joining glass bodies and standards, consisting of a table having a flanged collar and a separable glass-mold constructed to form the body only and fitting over said collar and having an aperture in the bottom thereof, in combination with a vertically-sliding stem under said aperture, said stem having a restricted portion, a platform, and a guide, said platform being arranged at a distance from the aperture in the bottom of the mold substantially equal to the length of the standard, and a lever pivoted to the table and having an end embracing said restricted portion, substantially as specified.

In testimony whereof I affix my signature in presence of two witnesses.

NATHAN B. SCOTT.

Witnesses:
E. BUCKMAN,
CHAS. L. EBELING.